(12) United States Patent
Teboulle et al.

(10) Patent No.: US 11,477,174 B2
(45) Date of Patent: Oct. 18, 2022

(54) METHOD FOR RE-REGISTERING A SMART ELECTRICITY METER

(71) Applicant: SAGEMCOM ENERGY & TELECOM SAS, Rueil Malmaison (FR)

(72) Inventors: Henri Teboulle, Rueil Malmaison (FR); Ziv Roter, Rueil Malmaison (FR); Jérémie Sergi, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 41 days.

(21) Appl. No.: 17/055,002

(22) PCT Filed: May 27, 2019

(86) PCT No.: PCT/EP2019/063580
§ 371 (c)(1),
(2) Date: Nov. 12, 2020

(87) PCT Pub. No.: WO2019/228948
PCT Pub. Date: Dec. 5, 2019

(65) Prior Publication Data
US 2021/0273922 A1 Sep. 2, 2021

(30) Foreign Application Priority Data

May 28, 2018 (FR) ...................................... 1854515

(51) Int. Cl.
*H04L 9/40* (2022.01)
*G01D 4/00* (2006.01)
(Continued)

(52) U.S. Cl.
CPC ......... *H04L 63/0428* (2013.01); *G01D 4/002* (2013.01); *G01R 22/063* (2013.01); *H04L 9/3263* (2013.01); *H04L 2463/041* (2013.01)

(58) Field of Classification Search
None
See application file for complete search history.

(56) References Cited

U.S. PATENT DOCUMENTS 7,986,718 B2 *  7/2011  Monier ............... H04B 17/318
                                                       455/435.2
8,583,520 B1 * 11/2013  Forbes, Jr. ............ B60L 53/63
                                                       700/286
(Continued)

FOREIGN PATENT DOCUMENTS

EP      3122061 A1    1/2017
EP      3182281 A1    6/2017

OTHER PUBLICATIONS

Jun. 11, 2019 International Search Report issued in International Patent Application No. PCT/EP2019/063580.

*Primary Examiner* — Brandon Hoffman
(74) *Attorney, Agent, or Firm* — Oliff PLC (57) ABSTRACT

A modem of a smart electricity meter obtains, following a registration in the powerline communication network of the ad hoc type, routing information and encryption information, by exchanges of messages in the powerline communication network. The smart electricity meter saves in non-volatile memory the routing information and the encryption information, the routing information being saved in association with information representing an instant at which the backup is made. At the time of a subsequent re-registration of the smart electricity meter following a disconnection of the powerline communication network, the smart electricity meter retrieves the routing and encryption information previously saved in the non-volatile memory, updates it by (Continued)

deleting any route information that is no longer valid, and uses it to communicate in the powerline communication network.

12 Claims, 6 Drawing Sheets

(51) Int. Cl.
  *G01R 22/06* (2006.01)
  *H04L 9/32* (2006.01)

(56) References Cited

U.S. PATENT DOCUMENTS

| 2012/0124367 | A1* | 5/2012 | Ota | H04W 12/0431 |
| | | | | 713/153 |
| 2013/0261821 | A1* | 10/2013 | Lu | G05B 13/02 |
| | | | | 700/289 |
| 2017/0171355 | A1* | 6/2017 | Roter | H04B 3/54 |

* cited by examiner

METHOD FOR RE-REGISTERING A SMART ELECTRICITY METER

FIELD OF SOME EMBODIMENTS

The present invention relates to the re-registering of a smart electricity meter in a powerline communication network, following a disconnection of the smart electricity meter.

BACKGROUND

Powerline communication networks for systems of the AMM (automated meter management) type have made their appearance during the past years. Mention can be made for example of the PRIME (PowerLine Intelligent Metering Evolution) specifications and the G3-PLC standard specified in the ITU-T recommendation G.9903. In such powerline communication networks, communications are established between so-called smart electricity meters and a data concentrator device, sometimes referred to as a base node or coordinator, in order in particular to allow a remote automated reading of electricity consumption measurements made by said smart electricity meters. A plurality of such data concentrator devices are typically deployed geographically so as to distribute the management load at a distance from a multitude of smart electricity meters, each data concentrator device then being connected to the same management entity of the AMM system that is managed by the operator of the electrical supply system to which said smart electricity meters are connected.

Figure 1:
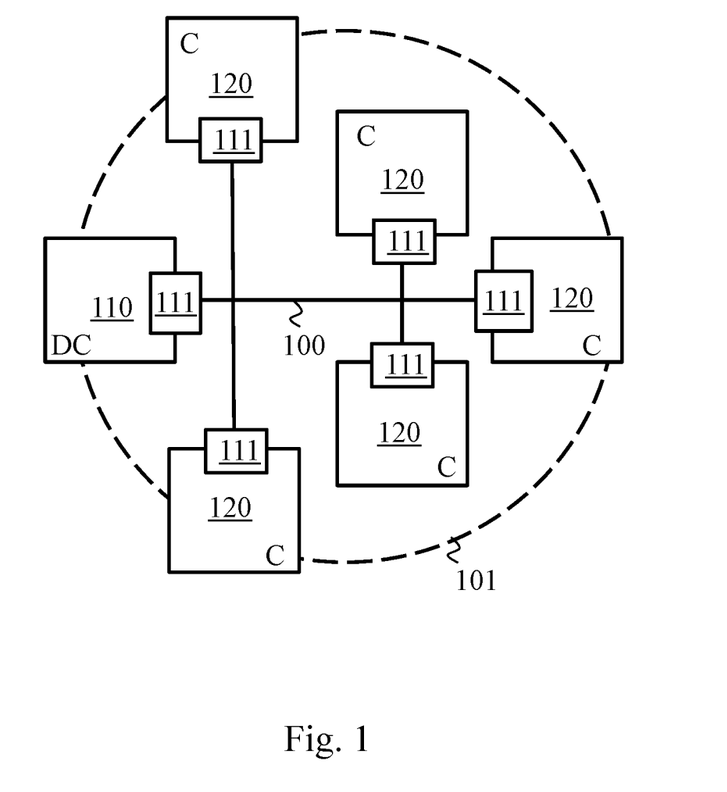
FIG. 1 illustrates schematically a communication system in the context of a remote automated management of smart electricity meters.

A communication system comprising a data concentrator DC 110 to which a plurality of smart electricity meters C 120 are connected logically is illustrated schematically in FIG. 1. To make it possible to exchange data between smart electricity meters C 120 and the data concentrator device DC 110, powerline communications are established. A powerline communication network 101 is thus formed between the data concentrator device DC 110 and the plurality of smart electricity meters C 120 that are connected thereto, relying on an electricity supply network 100 serving to supply electricity to the electrical installations that said smart electricity meters C 120 are responsible for monitoring. Thus the data concentrator device DC 110 and each smart electricity meter C 120 thus comprises a powerline communication interface 111 enabling it to communicate via the powerline communication network 101. According to an example embodiment, the powerline communication network 101 is an ad hoc routing network, e.g. one in accordance with the G3-PLC standard.

Powerline communications must deal with interference related to crosstalk phenomena, and/or to a lack of reliability of certain communication links in the powerline communication network (e.g. limit of range due to the length of the cables), and/or noises of various natures (white noises, coloured noises, impulse noises mainly), and/or impedance mismatches. For the record, crosstalk is a phenomenon that enables signals, typically by capacitive coupling, to propagate without passing through copper pairs proper, but through non-visible parasitic links. This phenomenon is unstable since it may vary according to the temperature or the activity on the powerline communication network. It should be noted that there may also be crosstalk within the same apparatus via copper connections on printed circuits or certain components that constitute said apparatus. These phenomena may cause losses of packets or messages, in particular of signalling packets or messages, and cause disconnections of smart electricity meters from the communication network.

When a smart electricity meter is disconnected from an ad hoc powerline communication network, and this smart electricity meter seeks to reintegrate the ad hoc powerline communication network, a re-registration procedure is triggered, and the smart electricity meter must exchange a set of messages in order to fill in a routing table representing communication routes that can be used in the ad hoc powerline communication network. This aspect is illustrated schematically in FIG. 2, where a said smart electricity meter C 120 shows a modem part MDM 251, managing the powerline communications, and an application part APP 252, which uses the modem part MDM 251 to transmit application data in the powerline communication network 101.

Figure 2:
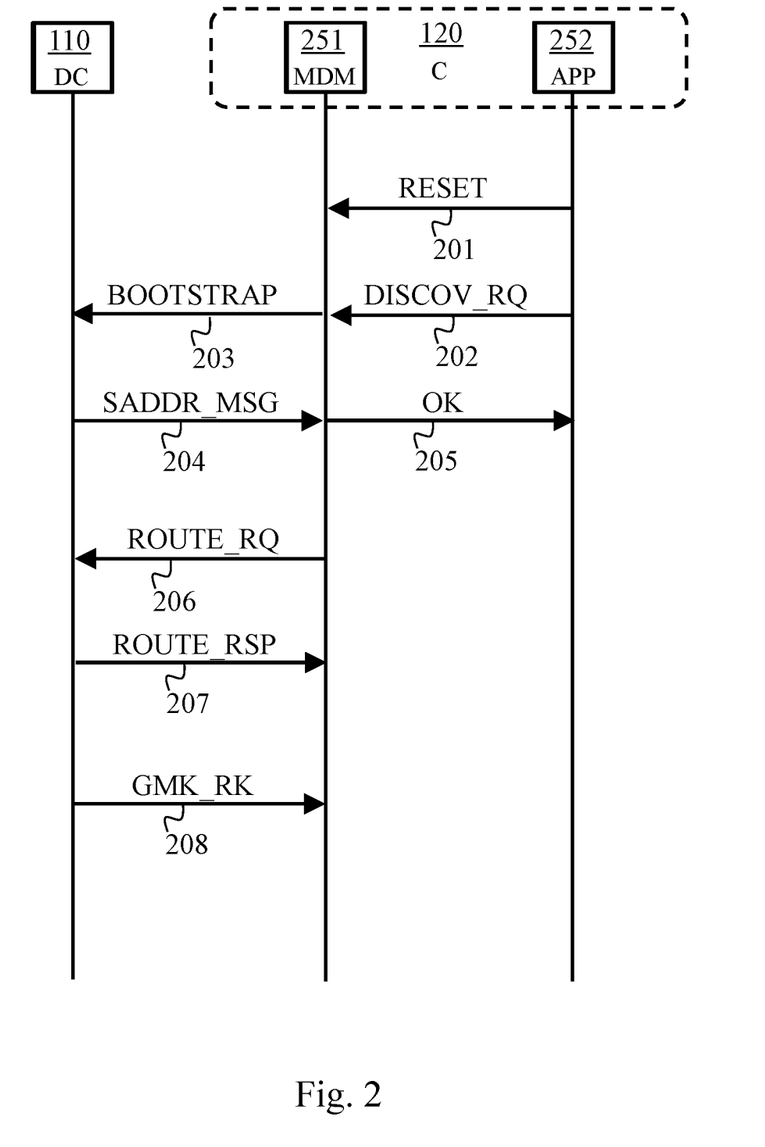
FIG. 2 illustrates schematically exchanges occurring when a smart electricity meter is brought into service in the communication system of FIG. 1, according to the prior art.

When the smart electricity meter C 120 is brought into service, in a step 201, the application APP 252 sends a reset signal RESET to the modem MDM 251, which consequently initialises itself. In a step 202, the application APP 252 sends to the modem MDM 251 a signal DISCOV_RQ requesting network discovery.

In a step 203, the modem MDM 251 discovers the powerline communication network 101 managed by the concentrator device DC 110 by means of a procedure referred to as bootstrap in the 6LoWPAN (the acronym for IPv6 Low Power Wireless Personal Area Network) terminology. In a step 204, the modem MDM 251 acquires an address, referred to as a short address, S_ADDR that is allocated to it to identify the smart electricity meter C 120 in question in the powerline communication network 101. The modem MDM 251 also obtains a network identifier PAN_ID that identifies the powerline communication network 101 as well as an encryption key GMK, which is itself encrypted by means of another encryption key OTP_PSK preconfigured in the modem MDM 251, e.g. at the manufacture of the smart electricity meter C 120, and derived from a key known to the concentrator device DC 110. The encryption key GMK then serves for the modem MDM 251 to encrypt and decipher communications on the powerline communication network 101. In a step 205, the modem MDM 251 sends a signal OK to the application 252 in order to indicate that it has responded to the network discovery request.

Following exchanges of route discovery messages ROUTE_RQ (Route Request) and ROUTE_RSP (Route Reply) in steps 206 and 207 in the powerline communication network 101, the modem MDM 251 updates a routing table RT that lists route information in the powerline communication network 101, such as:
- A route destination address (the starting point being the smart electricity meter C 120 of said modem MDM 251);
- An address of the next relay to be contacted for joining the route destination;
- Route cost information;
- Information on the number of relays, referred to as "hops", on the route;
- Information on the number of weak links (below a certain performance threshold) on the route;
- Route-validity time-period information (e.g. time remaining before expiry of the route or instant of lapsing of the route).

Renewals of the encryption key GMK may be initiated, in a step 208, by the concentrator device DC 110. The modem MDM 251 then receives a new encryption key GMK, still encrypted by means of the encryption key OTP_PSK.

The procedure for re-registration in the powerline communication network 101 is therefore lengthy to execute, which delays the moment at which the smart electricity meter, which has been disconnected, is once again in the operational state.

It is desirable to overcome these drawbacks of the prior art and in particular to accelerate the return to the operational state of such smart electricity meters. It is furthermore desirable to find a solution that makes it possible to preserve a high level of security in the protection of sensitive information, such as the encryption keys, of the powerline communication network.

To this end, the invention relates to a method for re-registering a smart electricity meter in an ad hoc powerline communication network. The method is such that, following a registration in the powerline communication network during which a modem of the smart electricity meter has obtained routing information as well as encryption information by exchanges of messages in the powerline communication network, said electricity meter performs the following step: saving in non-volatile memory routing information and encryption information, the routing information being saved in association with information representing an instant at which the saving is performed. And, in a subsequent re-registration of the smart electricity meter following a disconnection from the powerline communication network, said electricity meter performs the following steps: retrieval of the routing and encryption information previously saved in the non-volatile memory; updating of the routing information by deleting therefrom any route information that has lapsed between the instant at which the saving is performed and an instant of retrieval, by the modem, of the saved routing information; and use, by the modem for communicating in the powerline communication network, of the encryption information retrieved and the routing information updated.

According to a particular embodiment, the routing information comprises an address allocated to said smart electricity meter for identifying said smart electricity meter in the powerline communication network and a routing table describing routes in said powerline communication network, each route being associated with time validity information, and the updating of the routing information relates to the deletion of each route the associated time validity information of which after updating shows lapsing of said route.

According to a particular embodiment, said smart electricity meter saves in non-volatile memory the routing table on deletion of one or more routes from the routing table used by the modem for communicating in the powerline communication network, and on addition of one or more routes in said routing table used by the modem for communicating in the powerline communication network.

According to a particular embodiment, said smart electricity meter saves the routing table in non-volatile memory at regular intervals.

According to a particular embodiment, the encryption information comprises an encryption key used by the modem for communicating in an encrypted manner in the powerline communication network.

According to a particular embodiment, the encryption key is saved in non-volatile memory in an encrypted manner.

According to a particular embodiment, said smart electricity meter saves the encryption key in non-volatile memory on reception of a message renewing said encryption key.

According to a particular embodiment, when the updating of the routing information shows that said routing information has all lapsed, the modem performs the re-registration by exchanges of messages in the powerline communication network in order to re-obtain the routing information and the encryption information.

According to a particular embodiment, the smart electricity meter implementing a mechanism for checking the presence of a communication link governing the status of the state of the powerline communication network, the modem performs the re-registration by exchanges of messages in the powerline communication network in order to re-obtain the routing information and the encryption information when the status of the state of the powerline communication network has lapsed.

According to a particular embodiment, the smart electricity meter comprises an application, as well as: a unit controlling the application; a unit controlling the modem; a non-volatile memory accessible to the unit controlling the application but not to the unit controlling the modem; and a volatile memory accessible to the unit controlling the modem but not to the unit controlling the application. In addition, the routing information and the encryption information are saved in non-volatile memory by the unit controlling the application on behalf of the unit controlling the modem, and the unit controlling the modem uses the volatile memory for storing and updating the routing information and the encryption information used by the modem for communicating in the powerline communication network.

The invention also relates to a smart electricity meter intended to be used in an ad hoc powerline communication network. The smart electricity meter is such that, following a registration in the powerline communication network during which a modem of the smart electricity meter has obtained routing information and encryption information by exchanges of messages in the powerline communication network, said electricity meter implements the following means: means for saving in non-volatile memory routing information and encryption information, the routing information being saved in association with information representing an instant at which the saving is performed. And, at the time of a subsequent re-registration of the smart electricity meter following a disconnection of the powerline communication network, said electricity meter implements the following means: means for retrieving routing and encryption information previously saved in the non-volatile memory; means for updating the routing information by deleting therein any route information that has lapsed between the instant at which the saving is performed and an instant of retrieval, by the modem, of the routing information saved; means for using, by the modem, for communicating in the powerline communication network, the encryption information retrieved and the routing information updated.

According to a particular embodiment, the smart electricity meter comprises an application, as well as: a unit controlling the application; a unit controlling the modem; a non-volatile memory accessible to the unit controlling the application but not to the unit controlling the modem; and a volatile memory accessible to the unit controlling the modem but not to the unit controlling the application. In addition, the routing information and the encryption information are saved in non-volatile memory by the unit controlling the application on behalf of the unit controlling the modem, and the unit controlling the modem uses the volatile memory for storing and updating the routing information and the encryption information used by the modem for communicating in the powerline communication network.

The invention also relates to a computer program that can be stored on a medium and/or downloaded from a communication network in order to be read by a processor. This computer program comprises instructions for implementing the method mentioned above in accordance with any one of the embodiments thereof when said program is executed by the processor. The invention also relates to storage means comprising such a computer program.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DESCRIPTION

The invention detailed below is implemented in a powerline communication network that is an ad hoc routing network, e.g. in accordance with the G3-PLC standard, such as the powerline communication network 101. According to a preferred embodiment, the powerline communication network is in accordance with the G3-PLC standard.

Figure 3:
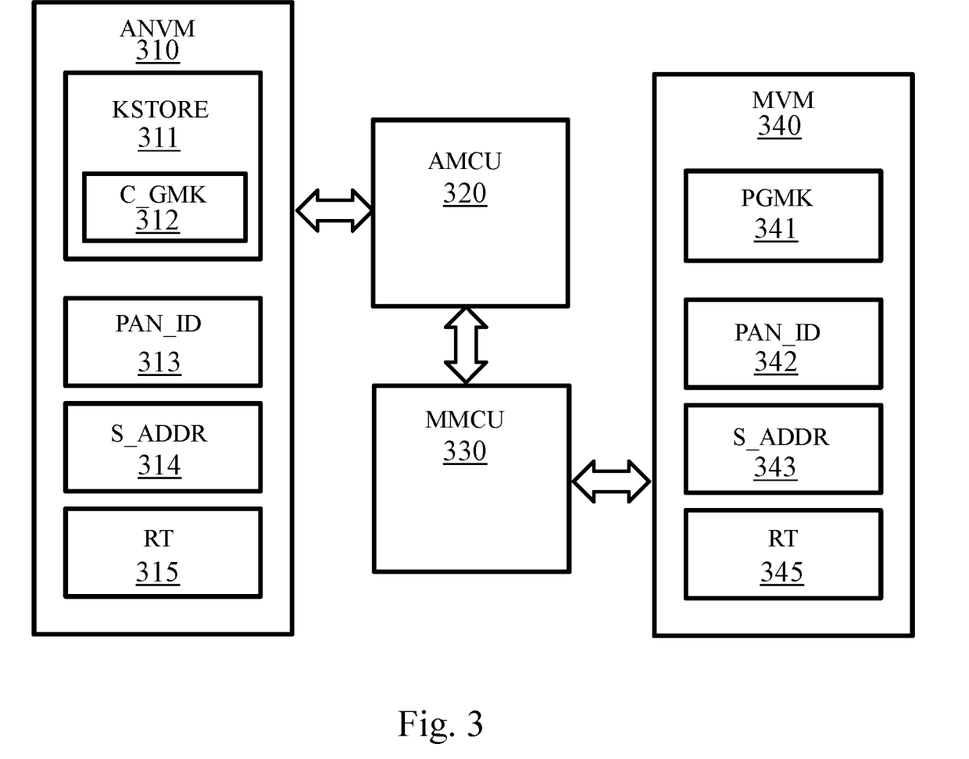
FIG. 3 illustrates schematically an internal arrangement of a smart electricity meter in accordance with an embodiment of the present invention.

FIG. 3 illustrates schematically an internal arrangement of a smart electricity meter C 120, according to an embodiment of the present invention. The modem MDM 251 of the smart electricity meter C 120 comprises a control unit MMCU 330 and the application APP 252 comprises a control unit AMCU 320. The modem MEM 251 and the application APP 252 communicate by means of the respective control units thereof.

The control unit AMCU 320 is associated with a non-volatile memory ANVM 310, such as a flash memory. The non-volatile memory ANVM 310 comprises memory areas intended to store a keychain KSTORE 311 wherein an encrypted version C_GMK of the encryption key GMK is included. The encrypted version C_GMK of the encryption key GMK is determined by the modem MDM 251 and is saved in the non-volatile memory ANVM 310 by the application APP 252 on behalf of the modem MDM 251. This aspect is described below.

The non-volatile memory ANVM 310 also comprises memory areas intended to save routing information used by the modem MDM 251 to communicate in the powerline communication network 101. These backups preferentially include a saved copy 315 of the routing table RT, as well as a saved copy of the address S_ADDR 314 allocated to said smart electricity meter C 120 for identifying said smart electricity meter C 120 in the powerline communication network 101. These backups preferentially also include a saved copy 313 of the identifier PAN_ID of the powerline communication network 101. This routing information is thus saved in the non-volatile memory ANVM 310 by the application APP 252 on behalf of the modem MDM 251. This aspect is also described below.

The backups made in the non-volatile memory ANVM 310 by the application APP 252 on behalf of the modem MDM 251 aim to enable the smart electricity meter C 120 to re-register quickly in the powerline communication network 101, as detailed below.

The control unit MMCU 330 is associated with a volatile memory MVM 340, such as a random access memory RAM. The volatile memory MVM 340 is, by structure of the smart electricity meter C 120, inaccessible for the control unit AMCU 320. The volatile memory MVM 340 comprises memory areas intended to store the encryption key GMK, preferably in encrypted form PGMK 341 in order to avoid being legible in clear by dumping of the volatile memory MVM 340. The encrypted version of the encryption key GMK stored in the volatile memory MEM 340 is obtained by the modem MDM 251 by encryption by means of an encryption key, referred to as the secret key, preconfigured (like the encryption key OTP_PSK) in the control unit MMCU 330 and therefore not accessible to the control unit AMCU 320.

The volatile memory MVM 340 also comprises memory areas intended to store the routing information used by the modem MDM 251 to communicate in the powerline communication network 101. Thus the volatile memory MVM 340 preferentially comprises memory areas for:

storing the routing table RT 345 that the modem MDM 251 uses for selecting routes in the powerline communication network 101; and storing the address S_ADDR 343 that the modem MDM 251 uses as an identifier for communicating in the powerline communication network 101.

Preferentially, the volatile memory MVM 340 preferentially comprises a memory area for in addition:

storing the identifier PAN_ID 342 in the powerline communication network 101.

The data stored in the volatile memory MVM 340 are continually used by the modem MDM 251 for communicating in the powerline communication network 101 until the smart electricity meter C 120 in question is disconnected therefrom.

It should be noted that the control unit MMCU 330 is provided with a real-time clock RTC enabling the modem MDM 251 to have available an absolute time reference, that is to say a time reference that remains consistent after disconnection and subsequent re-registration of the electricity meter C 120 in question in the powerline communication network 101. This means that, on re-registration in the powerline communication network 101, the smart electricity meter C 120 in question is directly synchronised in time with the other devices, namely the concentrator device DC 110 and the other smart electricity meters C 120, which makes it possible to avoid any desynchronisation of a mechanism checking the presence of a communication link of the "keep alive" type governing the status of the state of the powerline communication network 101.

Figure 4:
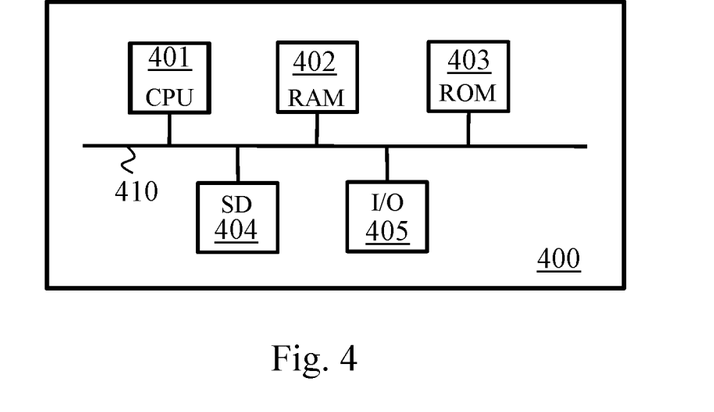
FIG. 4 illustrates schematically an example of hardware architecture of a unit controlling a smart electricity meter.

FIG. 4 illustrates schematically an example of hardware architecture of a control unit of a smart electricity meter C 120, such as the control unit AMCU 320 and the control unit MA/ICU 330.

The smart electricity meter C 120 in question then comprises, connected by a communication bus 410: a processor or CPU (central processing unit) 401, a random access memory RAM 402, for example the memory MVM 340; a read only memory ROM 403; a storage unit 404, such as a hard disk HDD (hard disk drive), or a storage medium reader, such as an SD (Secure Digital) card reader; a set of inputs/outputs 405 enabling the control unit to communicate with other units and/or memories and/or components of the smart electricity meter C 120.

The processor CPU 401 is capable of executing instructions loaded in the RAM memory 402 from the ROM memory 403, from an external memory (not shown), from a storage medium (such as an SD card), or from a communication network other than the powerline communication network 101. When the smart electricity meter C 120 in question is powered up, the processor 201 is capable of reading instructions from the RAM memory 202 and executing them. These instructions form a computer program causing an implementation, by the processor 201, of all or some of the algorithms and steps described below in relation to the control unit concerned.

All or some of the algorithms and steps described below can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

In general terms, each control unit of the smart electricity meter C 120 thus comprises electronic circuitry configured to implement all or some of the algorithms and steps described below in relation to the control unit concerned.

Figure 5:
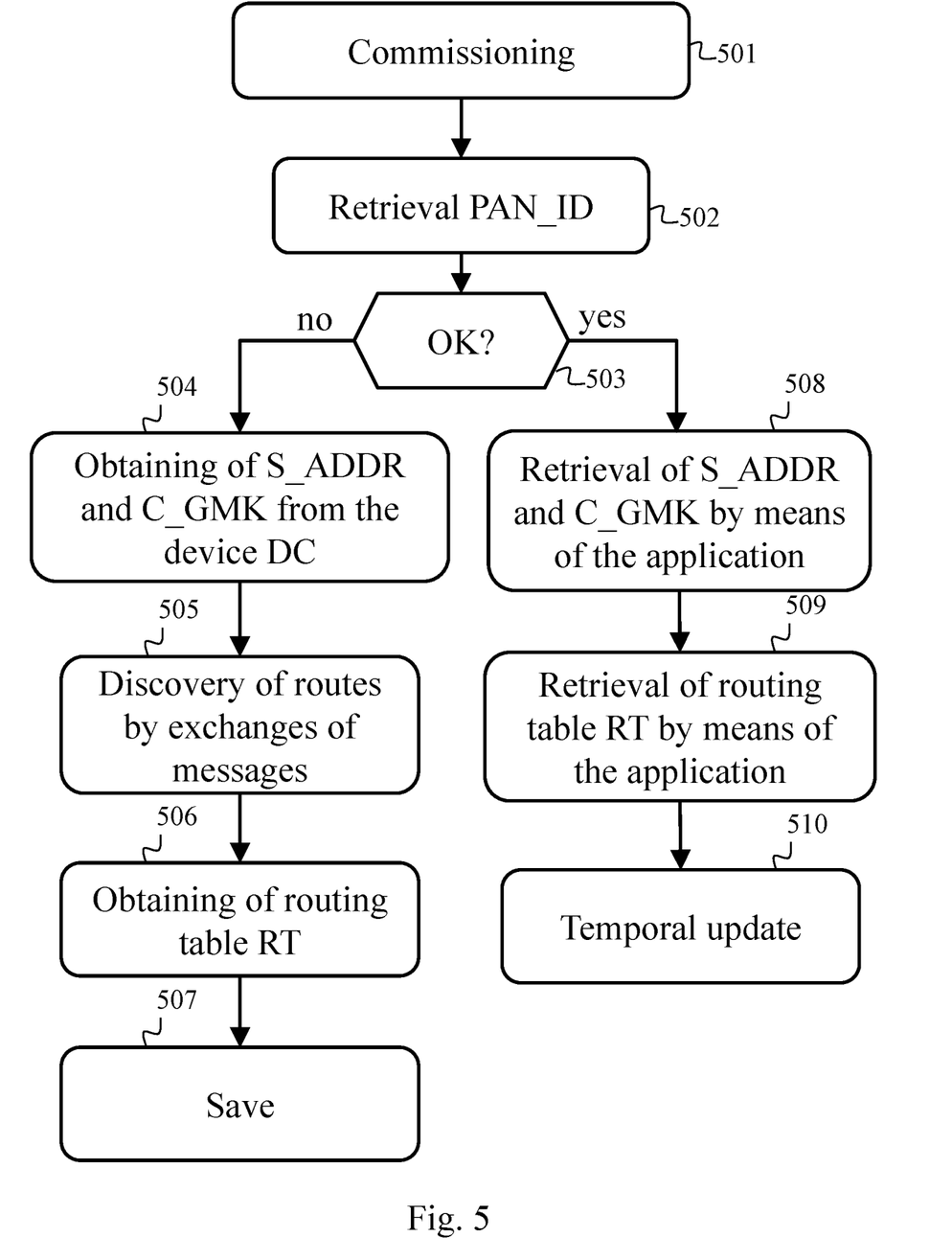
FIG. 5 illustrates schematically an algorithm for commissioning a smart electricity meter, according to an embodiment of the present invention.

FIG. 5 illustrates schematically an algorithm for commissioning a smart electricity meter C 120 according to one embodiment of the present invention.

In a step 501, the smart electricity meter C 120 is brought into service and detects the presence of the powerline communication network 101. The smart electricity meter C 120 then seeks to integrate or reintegrate, following a disconnection, the powerline communication network 101.

In a step 502, the modem MDM 251 seeks to retrieve from the application APP 252 any identifier PAN_ID that had previously been saved by the application APP 252 on behalf of the modem MDM 251. If such an identifier PAN_ID was previously saved by the application APP 252, this means that the smart electricity meter C 120 was previously connected to the powerline communication network 101 and was disconnected therefrom. Otherwise this means that it is the very first commissioning of the smart electricity meter C 120.

In a step 503, the modem MDM 251 checks whether the application APP 252 has supplied the identifier PAN_ID sought. If such is the case, a step 508 is performed; otherwise a step 504 is performed.

In the step 504, the modem MDM 251 performs a registration in the powerline communication network 101, as could have been dealt with in relation to FIG. 1. Thus, in the step 504, the modem MDM 251 obtains the address S_ADDR allocated by the concentrator device DC 110 to said smart electricity meter C 120, and as well as the encrypted version C_GMK of the encryption key GMK. The modem MDM 251 deciphers, by means of the key OTP_PSK, the encrypted version C_GMK of the encryption key GMK so as to obtain the encryption key GMK. With a view to a storage in the volatile memory MVM 340, the modem MDM 251 can regenerate a new encrypted version of the encryption key GMK, as already mentioned, using its secret key.

In a step 505, the modem MDM 251 effects a discovery of routes in the powerline communication network 101. Thus, in a step 506, by virtue of the discovery of routes, the modem MDM 251 fills in its routing table RT.

The routing information and the encryption information thus obtained by the modem MDM 251 in the steps 504 and 506 are stored by the modem MDM 251, as already described in relation to FIG. 3, and are in particular used by the modem MDM 251 to transmit and receive application data on behalf of the application APP 252 in the powerline communication network 101.

In a step 507, the application APP 252 saves, in the non-volatile memory ANVM 310, the routing information and the encryption information on behalf of the modem MDM 251, as already described in relation to FIG. 3. This backup may be at the initiative of the modem MDM 251 or of the application APP 252, and serves for any subsequent re-registration of the smart electricity meter C 120 in the powerline communication network 101. This backup also includes time information T representing the instant at which the backup is made; this time information makes it possible to update the temporal validity of the routes entered in the routing table RT at the moment of any subsequent re-registration of the smart electricity meter C 120, as described below. The algorithm in FIG. 5 is then ended.

In the step 508 and in a step 509, the modem MDM 251 retrieves, by means of the application APP 252, the routing information and the encryption information previously saved by the application APP 252 in the non-volatile memory ANVM 310 on behalf of the modem MDM 251. More particularly, in the step 508, the modem MDM 251 obtains the address S_ADDR previously allocated by the concentrator device DC 110 to said smart electricity meter C 120, as well as the encrypted version C_GMK of the encryption key GMK. The modem MDM 251 deciphers, by means of its secret key, the encrypted version C_GMK of the encryption key GMK so as to obtain the encryption key GMK. With a view to storage in the volatile memory MVM 340, the modem MDM 251 can regenerate a new encrypted version of the encryption key GMK, as already mentioned. In addition, in the step 509, the modem MDM 251 obtains its routing table RT, as saved by the application APP 252.

Then, in a step 510, the modem MDM 251 performs a temporal updating of the routing table RT retrieved by means of the backup made by the application APP 252 on behalf of the modem MDM 251. In other words, the modem MDM 251 deletes from this routing table RT the routes that are no longer valid. For example, the routing table RT includes information on the remaining time of validity of each route described in said routing table RT. This information on the remaining validity time is continuously updated by the modem MDM 251 over time, and at re-registration the modem MDM 251 takes account of a time D between the instant at which the backup was made by the application APP 252 (represented by the aforementioned time information T) and the instant at which the routing information (and more particularly the routing table) saved is retrieved by the modem MDM 251. The modem MDM 251 then deducts the time D from the information on remaining validity time of each route entered in the routing table RT retrieved. If this gives a zero or negative result, the modem MDM 251 deletes the corresponding route from the routing table RT; otherwise the modem MDM 251 updates the information on remaining validity time with the result obtained.

At the end of the step 510, the routing information and the encryption information thus obtained by the modem MDM 251 are stored by the modem MDM 251, as already described in relation to FIG. 3, and are in particular used by the modem MDM 251 in order to transmit and receive application data on behalf of the application APP 252 in the powerline communication network 101.

When performance of the step 510 leads to an updated routing table RT that is empty of any route, a new routing table must be constructed. This can be done by exchanges of the route discovery messages ROUTE_RQ and ROUTE_RSP of the steps 206 and 207. In a particular embodiment, a complete re-registration of the smart electricity meter C 120 in question is performed, as if it were the very first registration of said smart electricity meter C 120 in the powerline communication network 101.

In addition, in a particular embodiment, when the mechanism for checking the presence of a communication link of the "keep alive" type shows, when said smart electricity meter C 120 is recommissioned, that the status of the state of the powerline communication network 101 is no longer valid, then a complete re-registration of the smart electricity meter C 120 in question is performed, as if it were the very first registration of said smart electricity meter C 120 in the powerline communication network 101.

Figure 6:
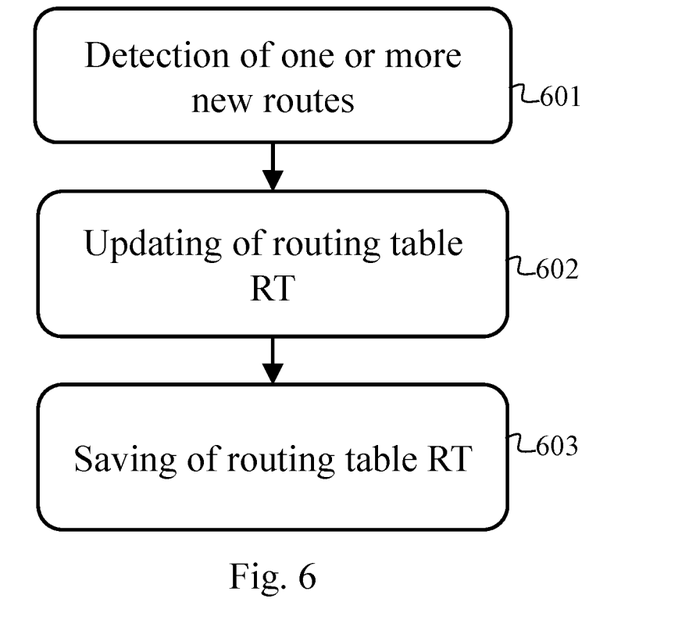
FIG. 6 illustrates schematically an algorithm for saving routing information, according to an embodiment of the present invention.

FIG. 6 illustrates schematically an algorithm for saving routing information, in accordance with an embodiment of the invention.

In a step 601, the modem MDM 251 detects a need to update the routing table RT currently being used, by adding or deleting one or more routes. One or more routes are thus added or removed from the routing table RT used by the modem MDM 251.

In a step 602, the modem MDM 251 accordingly updates the routing table RT stored in the volatile memory MVM 340.

In a step 603, the modem MDM 251 requests the application APP 252 to perform a backup, in the non-volatile memory ANVM 310, of the routing table RT thus updated, as well as time information T representing the instant at which the backup is made.

Thus the routing information is saved whenever there is a change of route in the routing table RT used by the modem MDM 251.

In a variant or in addition, the saving of the routing table RT in non-volatile memory is done periodically. The time information T representing the instant at which the saving is done is also saved on this occasion. This periodic saving can be initiated by the modem MDM 251 or by the application APP 252.

Figure 7:
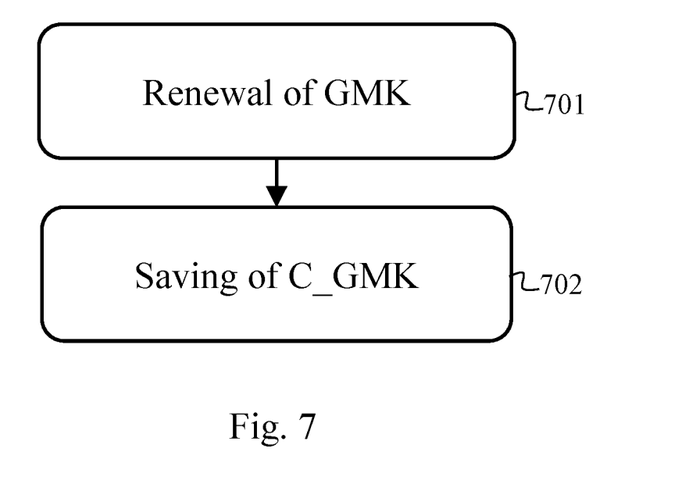
FIG. 7 illustrates schematically an algorithm for saving encryption information, according to an embodiment of the present invention.

FIG. 7 illustrates schematically an algorithm for saving encryption information, according to an embodiment of the present invention.

In a step 701, the modem MDM 251 receives a message coming from the concentrator device DC 110 indicating a renewal of the encryption key GMK. A new encryption key GMK is then supplied by the concentrator device DC 110, this new encryption key being encrypted by means of the secret key of the modem MDM 251. The modem MDM 251 updates the relevant memory area of the volatile memory MVM 340 accordingly.

In a step 702, the modem MDM 251 requests the application APP 252 to make a backup, in the non-volatile memory ANVM 310, of the encrypted version C_GMK of the encryption key GMK.

Figure 8:
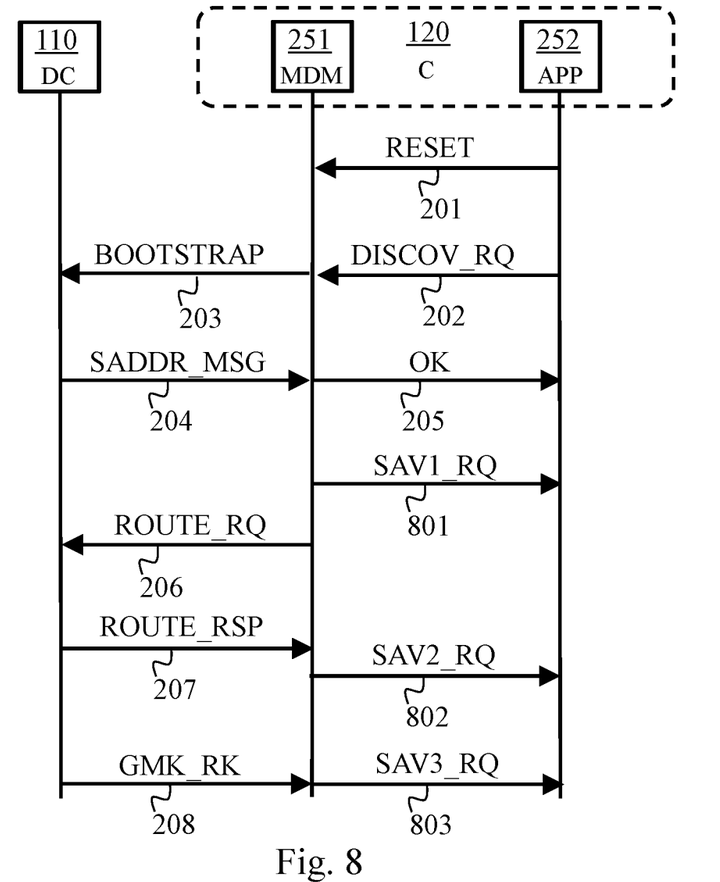
FIGS. 8 and 9 illustrate schematically exchanges occurring when a smart electricity meter is commissioned, according to an embodiment of the present invention.
Figure 9:
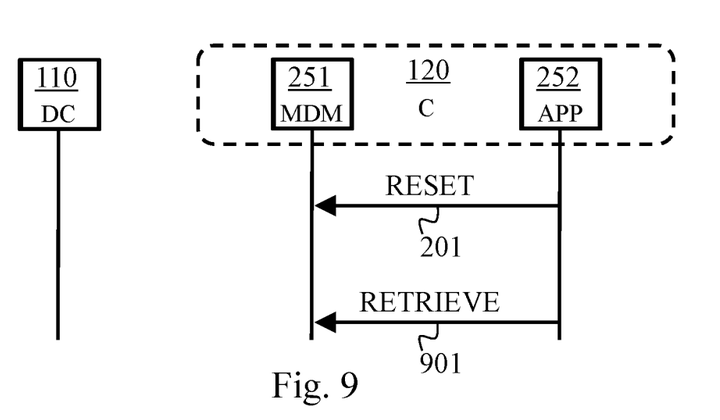

FIGS. 8 and 9 illustrate schematically exchanges occurring when a smart electricity meter C 120 is commissioned, according to an embodiment of the present invention. FIG. 8 shows the exchanges between the smart electricity meter C 120 in question and the concentrator device DC 110 in the case of a very first registration in the powerline communication network 101, or at the time of a re-registration, in the event of the previously saved routing table RT no longer being valid. FIG. 8 repeats FIG. 1, and the steps common to the two algorithms bear the same respective references in both FIGS.

When the modem MDM 251 obtains the identifier PAN_ID, the address S_ADDR that is allocated to it for communicating in the powerline communication network 101, and the encryption key GMK, a saving in the non-volatile memory ANVM 310 is performed in a step 801. A message SAV1_RQ from the modem MDM 251 to the application APP 252 including the information to be saved is used to do this. This message SAV1_RQ may in a variant be merged with the message OK of the step 205.

When the modem MDM 251 updates the routing table RT following the exchanges of route discovery messages ROUTE_RQ and ROUTE_RSP in the steps 206 and 207, a saving in the non-volatile memory ANVM 310 is performed in a step 802. A message SAV2_RQ from the modem MDM 251 to the application APP 252 including the information to be saved is used to do this.

When a renewal of the encryption key GMK is performed, a saving in the non-volatile memory ANVM 310 is made thereof in encrypted form in a step 803. A message SAV3_RQ from the modem MDM 251 to the application APP 252 including the information to be saved is used to do this.

Thus, at the time of any subsequent re-registration of the smart electricity meter C 120 in the powerline communication network 101, the modem MDM 251 has routing and encryption information that can allow a rapid return to the operational state of the smart electricity meter C 120 in the powerline communication network 101.

FIG. 9 shows the exchanges between the smart electricity meter C 120 in question and the concentrator device DC 110 in the case of re-registration in the powerline communication network 101. Following the step 201, a message RETRIEVE is transmitted in a step 901 from the application APP 252 to the modem MDM 251. This message RETRIEVE contains the routing and encryption information previously saved by the application APP 252 in the non-volatile memory ANVM 310 on behalf of the modem MDM 251. If the processing of this routing information by the modem MDM 251 shows that said routing data are no longer valid, then the modem MDM 251 informs the application APP 252 thereof and the exchanges in FIG. 8 are made in order to re-obtain the routing and encryption information via the powerline communication network 101.

The above description takes account of a certain current hardware architecture of the smart electricity meters. More particularly, the above description takes account of the fact that the current smart electricity meters have available a non-volatile memory allocated to the control unit responsible for application questions and a volatile memory allocated to the questions of management of the MAC (medium access control) layer. A variant consists however of allocating a non-volatile memory to the modem MDM 251 to enable said modem MDM 251 to make the aforementioned backups without having recourse to the application APP 252.

In a particular embodiment, when the smart electricity meter C 120 is disconnected from the powerline communication network 101 but said smart electricity meter C 120 remains electrically supplied (e.g. by a backup supply source), the routing information is saved in non-volatile memory so as to save the most recent information held.

The invention claimed is:

1. A method for re-registering a smart electricity meter in an ad hoc powerline communication network, wherein, following a registration in the powerline communication network during which a modem of the smart electricity meter has obtained routing information as well as encryption information by exchanges of messages in the powerline communication network, the method comprises:
   saving, by said smart electricity meter, in non-volatile memory routing information and encryption information, the routing information being saved in association with information representing an instant at which the saving is performed;
   and, in a subsequent re-registration of the smart electricity meter following a disconnection from the powerline communication network, the method comprises:
   retrieval, by said smart electricity meter, of the routing and encryption information previously saved in the non-volatile memory;
   updating, by said smart electricity meter, of the routing information by deleting therefrom any route information that has lapsed between the instant at which the saving is performed and an instant of retrieval, by the modem, of the saved routing information;
   use, by the modem for communicating in the powerline communication network, of the encryption information retrieved and the routing information updated,
   wherein the routing information comprises an address allocated to said smart electricity meter for identifying said smart electricity meter in the powerline communication network and a routing table describing routes in said powerline communication network, each route being associated with time validity information, and the updating of the routing information relates to the deletion of each route the associated time validity information of which after updating shows lapsing of said route.

2. The method according to claim 1, wherein said smart electricity meter saves in non-volatile memory the routing table on deletion of one or more routes from the routing table used by the modem for communicating in the powerline communication network, and on addition of one or more routes in said routing table used by the modem for communicating in the powerline communication network.

3. The method according to claim 1, wherein said smart electricity meter saves the routing table in non-volatile memory at regular intervals.

4. The method according to claim 1, wherein the encryption information comprises an encryption key used by the modem for communicating in an encrypted manner in the powerline communication network.

5. The method according to claim 4, wherein the encryption key is saved in non-volatile memory in an encrypted manner.

6. The method according to claim 4, wherein said smart electricity meter saves the encryption key in non-volatile memory on reception of a message renewing said encryption key.

7. The method according to claim 1, wherein, when the updating of the routing information shows that said routing information has all lapsed, the modem performs the re-registration by exchanges of messages in the powerline communication network in order to re-obtain the routing information and the encryption information.

8. The method according to claim 1, wherein, the smart electricity meter implementing a mechanism for checking the presence of a communication link governing the status of the state of the powerline communication network, the modem performs the re-registration by exchanges of messages in the powerline communication network in order to re-obtain the routing information and the encryption information when the status of the state of the powerline communication network has lapsed.

9. The method according to claim 1, wherein the smart electricity meter comprises an application, as well as:
   a unit controlling the application;
   a unit controlling the modem;
   a non-volatile memory accessible to the unit controlling the application but not to the unit controlling the modem; and
   a volatile memory accessible to the unit controlling the modem but not to the unit controlling the application;
   and wherein the routing information and the encryption information are saved in non-volatile memory by the unit controlling the application on behalf of the unit controlling the modem and in that the unit controlling the modem uses the volatile memory for storing and updating the routing information and the encryption information used by the modem for communicating in the powerline communication network.

10. A non-transitory storage medium storing a computer program comprising instructions causing execution, by a smart electricity meter, of the a method according to claim 1, when said instructions are read and executed by a processor of said smart electricity meter, wherein the method is for re-registering a smart electricity meter in an ad hoc powerline communication network, wherein, following a registration in the powerline communication network during which a modem of the smart electricity meter has obtained routing information as well as encryption information by exchanges of messages in the powerline communication network, the method comprises:
   saving, by said smart electricity meter, in non-volatile memory routing information and encryption information, the routing information being saved in association with information representing an instant at which the saving is performed;
   and, in a subsequent re-registration of the smart electricity meter following a disconnection from the powerline communication network, the method comprises:
   retrieval, by said smart electricity meter, of the routing and encryption information previously saved in the non-volatile memory;
   updating, by said smart electricity meter, of the routing information by deleting therefrom any route information that has lapsed between the instant at which the saving is performed and an instant of retrieval, by the modem, of the saved routing information;
   use, by the modem for communicating in the powerline communication network, of the encryption information retrieved and the routing information updated, wherein the routing information comprises an address allocated to said smart electricity meter for identifying said smart electricity meter in the powerline communication network and a routing table describing routes in said powerline communication network, each route being associated with time validity information, and the updating of the routing information relates to the deletion of each route the associated time validity information of which after updating shows lapsing of said route.

11. A smart electricity meter to be used in an ad hoc powerline communication network, wherein, following a registration in the powerline communication network during which a modem of the smart electricity meter has obtained routing information and encryption information by exchanges of messages in the powerline communication network, said smart electricity meter electronics circuitry configured for:

saving in non-volatile memory routing information and encryption information, the routing information being saved in association with information representing an instant at which the saving is performed;

and, at the time of a subsequent re-registration of the smart electricity meter following a disconnection of the powerline communication network:

retrieving routing and encryption information previously saved in the non-volatile memory;

updating the routing information by deleting therein any route information that has lapsed between the instant at which the saving is performed and an instant of retrieval, by the modem, of the routing information saved;

using, by the modem, for communicating in the powerline communication network, the encryption information retrieved and the routing information updated, wherein the routing information comprises an address allocated to said smart electricity meter for identifying said smart electricity meter in the powerline communication network and a routing table describing routes in said powerline communication network, each route being associated with time validity information, and the updating of the routing information relates to the deletion of each route the associated time validity information of which after updating shows lapsing of said route.

12. The smart electricity meter according to claim 11, wherein the smart electricity meter comprises an application, as well as:

a unit controlling the application;

a unit controlling the modem;

a non-volatile memory accessible to the unit controlling the application but not to the unit controlling the modem; and a volatile memory accessible to the unit controlling the modem but not to the unit controlling the application;

and wherein the routing information and the encryption information are saved in non-volatile memory by the unit controlling the application on behalf of the unit controlling the modem, and wherein the unit controlling the modem uses the volatile memory for storing and updating the routing information and the encryption information used by the modem for communicating in the powerline communication network.

\* \* \* \* \*